(No Model)
J. F. SINKLER.
VEHICLE BRAKE.
No. 533,501. Patented Feb. 5, 1895.
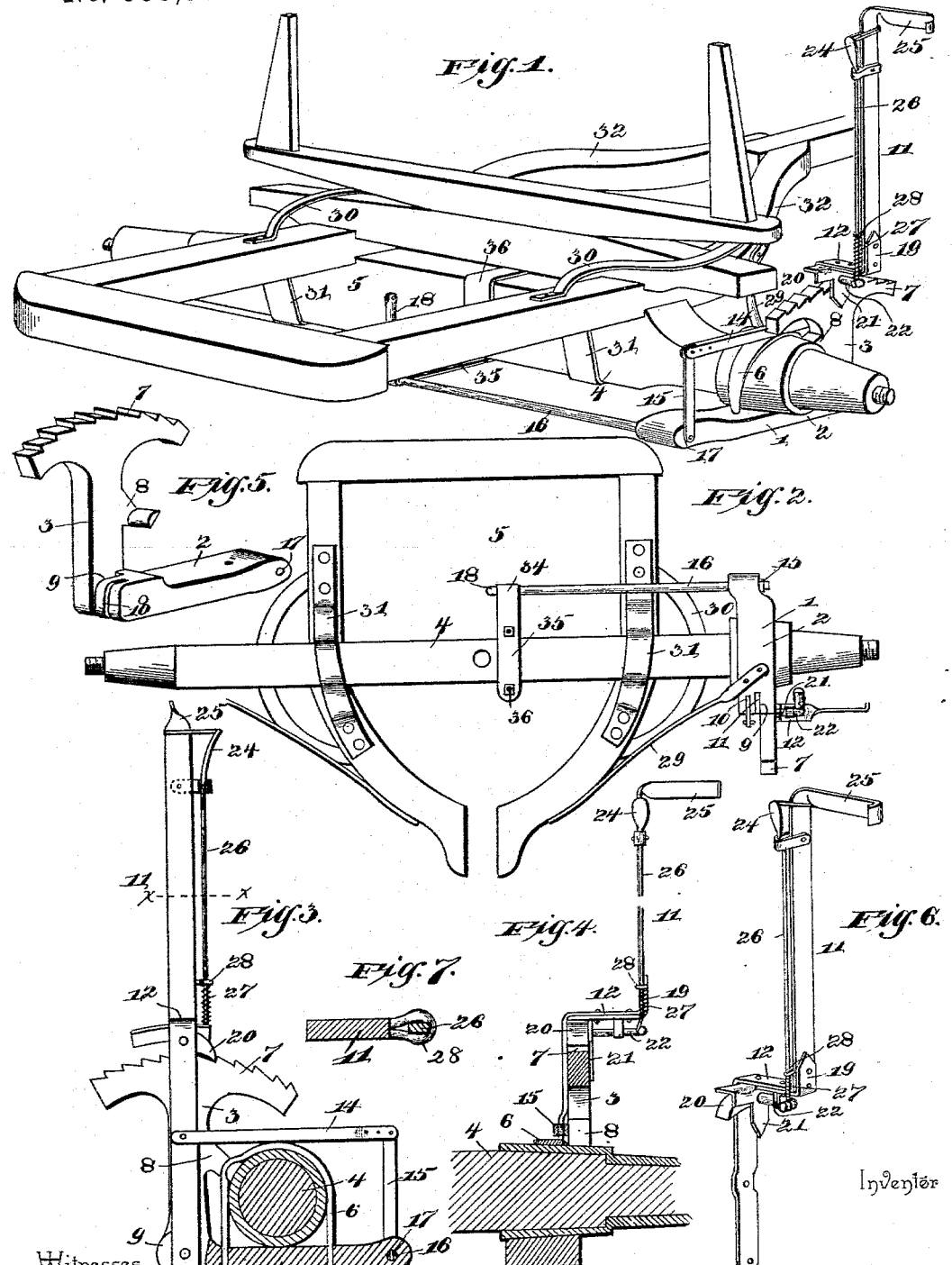
Witnesses
Wm. T. Doyle
J. W. Riley
Inventor
James F. Sinkler
By his Attorneys,
C. A. Snow & Co.

UNITED STATES PATENT OFFICE.

JAMES F. SINKLER, OF TROY, TENNESSEE.

VEHICLE-BRAKE.

SPECIFICATION forming part of Letters Patent No. 533,501, dated February 5, 1895.

Application filed August 6, 1894. Serial No. 519,577. (No model.)

*To all whom it may concern:*

Be it known that I, JAMES F. SINKLER, a citizen of the United States, residing at Troy, in the county of Obion and State of Tennessee, have invented a new and useful Vehicle-Brake, of which the following is a specification.

The invention relates to improvements in vehicle brakes.

The object of the present invention is to improve the construction of vehicle brakes, and to provide a simple and efficient one by which great leverage may be readily exerted, and which will be within convenient reach of the driver, and be capable of easy operation.

The invention consists in the construction and novel combination and arrangement of parts hereinafter fully described, illustrated in the accompanying drawings, and pointed out in the claims hereto appended.

In the drawings—Figure 1 is a perspective view of a portion of a running gear provided with brake operating mechanism constructed in accordance with this invention. Fig. 2 is a reverse plan view of the same. Fig. 3 is a longitudinal sectional view of the brake operating mechanism. Fig. 4 is a transverse sectional view of the same. Fig. 5 is a detail perspective view of the bracket. Fig. 6 is a similar view of the operating lever. Fig. 7 is a detail sectional view of the operating lever.

Like numerals of reference indicate corresponding parts in all the figures of the drawings.

1 designates a ratchet bracket, having a horizontal clip plate 2 and provided with a vertical portion 3. The clip plate or horizontal portion of the bracket extends beneath the front axle 4 of a running gear 5, and is secured to the adjacent axle skein by a clip 6; and the vertical portion 3 of the bracket is located in advance of the axle and is provided at the top with a curved ratchet 7. The ratchet 7 is curved, and is provided with forwardly shouldered teeth; and below the ratchet is located a rearwardly extending lug 8, which bears against the axle skein, and supports the front portion of the bracket.

At the angle of the bracket, which is approximately L-shaped, is provided bifurcations or slots 9 and 10; and in the bifurcation or slot 9 is fulcrumed the lower end of an operating lever 11, which extends upward at the inner side of the bracket to the top thereof, and is outwardly offset above the same, being provided with a horizontal portion 12 formed by rectangular bends, and offsetting the upper portion of the lever. The lower portion of the operating lever is connected by a bar 14 with an outer arm 15 of a rock-shaft 16, which is journaled in a bearing 17 at the rear end of the horizontal clip plate portion of the bracket, and which is provided at its inner end with an arm 18. The arm 18 is designed to be connected by a rod or the like with a rock-shaft or brake-bar located in rear of the front wheels, whereby, when the operating lever is thrown forward the shoes will be applied to the rear sides of the front wheel. The brake shoes, and the manner of mounting the same, may be of any ordinary construction, as will be readily understood, and for that reason it will be unnecessary to illustrate the same in the accompanying drawings.

A bearing plate 19 is bolted, or otherwise secured, to the offset portion of the operating lever. It is provided with a forward and rearward extending L-shaped flange which forms a partial housing or shield for a pawl 20; and it has a depending flange 21 located at the outer side of the ratchet, and retaining the operating lever in proper position.

The pawl 20 is provided with a pivot 22, which is journaled in bearings of the plate 19, and which is provided at its outer end with an arm. The bearings of the plate 19 are of sufficient size to permit the pivot of the pawl to be passed through them, in order to render the pawl detachable when the bearing plate is removed from the operating lever. The arm of the pivot of the pawl is connected by a resilient rod with a latch lever 24, which is fulcrumed on the operating lever adjacent to the handle portion 25 thereof. The resilient rod 26 is spring actuated, a spiral spring 27 being disposed between the arm of the pawl and an eye 28 extending outward from the operating lever, whereby the pawl is held in engagement with the ratchet.

The horizontally disposed upper end of the oscillating lever is adapted to be engaged either by hand or foot, and the latch lever may be similarly operated. The resilient, spring-actuated rod is flattened between the eye and the latch lever; and its upper end is threaded and screws into a socket of the latch lever. Its lower end is bent at an angle and engages an opening in the arm of the pawl. The latch lever 24, to which the upper end of the resilient rod is secured, is provided at its lower end with a pair of arms, which are pivoted to the lever 11; and the lever 24 has at its upper end guide arms loosely receiving the operating lever.

The running gear is provided at opposite sides of the hounds with inclined braces 29, extending from the hounds to the bracket, and to a corresponding point on the opposite end of the axle. Supporting bars 30 and 31 are secured to the upper and lower face of each hound 32, and prevent the parts from sagging or dropping and interfering with the brake mechanism. The bifurcation 10 of the bracket is adapted to receive a stay chain.

It will be seen that the brake operating mechanism is adapted to be readily applied to any ordinary running gear, that it is capable of easy operation, being adapted to be engaged by the hand or foot of the driver to enable him to control the vehicle when carrying a high load, and that powerful leverage is obtained.

The connecting bar extending from the operating lever to the rock-shaft is provided at its rear end with a series of perforations to permit an adjustment of the parts, and the inner terminus of the rock-shaft is journaled in a bearing eye 34 of a clip plate 35, which is secured to the axle by a clip 36.

Changes in the form, proportion, and the minor details of construction may be resorted to without departing from the principle or sacrificing any of the advantages of this invention.

What I claim is—

1. In a brake operating mechanism, the combination with a running gear, of an approximately L-shaped bracket provided at its top with a ratchet and located in advance of the front axle and having a rearward extending clip plate located beneath the axle, a clip securing the bracket to the axle and passing through the clip plate, an operating lever fulcrumed on the bracket and carrying a pawl engaging the ratchet, a rock-shaft journaled on the rear end of the clip plate and having an upward extending arm, and connections between the operating lever and the arm of the rock-shaft, substantially as described.

2. In a brake operating mechanism, the combination of an approximately L-shaped bracket having a horizontal clip plate and provided at its top with a ratchet, an operating lever fulcrumed at its lower end to the bracket and extending upward at the inner side thereof, and offset outward above the ratchet, a bearing plate secured to the operating lever and located beneath the offset portion thereof and provided with forward and rearward extending flanges and having a depending flange located at the outer side of the ratchet, a pawl located beneath the forward and rearward extending flanges and having a pivot journaled in suitable bearings and provided with an arm, and a latch lever mounted on the operating lever and connected with the arm of the pivot, substantially as described.

3. In a brake operating mechanism, the combination with a running gear, of a bracket clipped to the front axle thereof and provided at the top with a ratchet, an operating lever fulcrumed on the bracket at the inner side thereof and offset outward above the ratchet, a bearing plate secured to the operating lever and located beneath the offset portion thereof an eye extending outward from the operating lever, a pawl pivoted on the bearing plate and provided with an arm, a latch lever fulcrumed on the operating lever, a resilient rod connecting the latch lever with the arm of the pawl and extending through said eye, and a spiral spring disposed on the rod and interposed between the arm and the eye, substantially as described.

In testimony that I claim the foregoing as my own I have hereto affixed my signature in the presence of two witnesses.

JAMES F. SINKLER.

Witnesses:
J. G. SMITH,
J. M. VADEN.